INSULATOR PIN

Filed Feb. 3, 1966 2 Sheets-Sheet 1

INVENTORS
George M. Ruoff
James J. Amos
BY Schmieding and Fultz
ATTORNEYS

INVENTORS
George M. Ruoff
James J. Amos
BY Schmieding and Fultz
ATTORNEYS

United States Patent Office 3,392,569

Patented July 16, 1968

3,392,569

INSULATOR PIN

George M. Ruoff, Parkersburg, W. Va., and James J. Amos, Delaware, Ohio, assignors to The Columbus Auto Parts Company, Columbus, Ohio, a corporation of Ohio Filed Feb. 3, 1966, Ser. No. 524,893
10 Claims. (Cl. 72—377)

ABSTRACT OF THE DISCLOSURE

This invention relates to an improved insulator pin construction, and method of making same, of the type used as a base for supporting porcelain insulators which are in turn used to support high voltage electrical conductors. More specifically the insulator pin includes integrally formed shank and base flange portions, and a junction between said portions that includes surface regions of work hardened metal that adapt the pin to resist high bending stresses to which the apparatus is subjected during operational use.

This invention relates to apparatus insulators for electrical equipment and particularly to an improved insulator pin component thereof and method of making same characterized by superior strength characteristics.

In general, electrical apparatus insulators are used in high voltage installations for switch bases and the like and comprise as a main component an insulator pin which serves as a base for supporting porcelain insulators which in turn support the high voltage electrical conductors.

It is the above mentioned insulator pin components to which the present invention relates.

In accordance with the present invention the improved insulator pin comprises a novel structural configuration wherein a shank portion is joined to a flange portion at a generally frusto-conical junction that includes work-hardened inner and outer surface regions that greatly strengthen said junction between the shank and flanged portions.

As another aspect of the present invention the improved insulator pin is formed by a novel method wherein axial pressure is applied to a metal workpiece in a confining die means to first flow metal to form a partially completed flange portion that includes a bottom surface provided with an annular protrusion that surrounds a central recess. The workpiece is next subjected to additional die operations to axially inwardly displace the above-mentioned annular protrusion and central recess and thereby flow metal radially outwardly to form the finished flange portion having a peripheral protrusion of work-hardened densified metal possessing superior strength characteristics. Said peripheral protrusion functions in the finished pin construction to evenly engage the subfloor and resist bending loads to which the apparatus is subjected in operational use.

As still another aspect of the present invention the novel method of forming insulator pins and the pin configuration incorporates a recessed or hollow frusto-conical junction portion that results in a substantial saving in the metal stock required to form a pin of any given size. This results in a substantial savings in production cost.

It is therefore an object of the present invention to provide an improved insulator pin that includes a work-hardened shank to flange junction providing superior strength characteristics.

It is another object of the present invention to provide an improved insulator pin that includes a work-hardened flange portion and peripheral flange protrusion that provide superior strength characteristics.

It is another object of the present invention to provide an improved method of forming insulator pins at selected portions of the workpiece from which the pin is formed so as to provide strengthened zones at critical portions of the pin structure.

It is till another object of the present invention to provide an improved method of forming insulator pins that permits the use of workpieces of reduced size with respect to any given size pin whereby a substantial reduction in metal stock requirement is realized with a corresponding saving in production cost.

Further objects and advantages of the present invention will be apparent from the following description, reference being had to the accompanying drawings wherein a preferred form of the invention is clearly shown.

Figure 1:
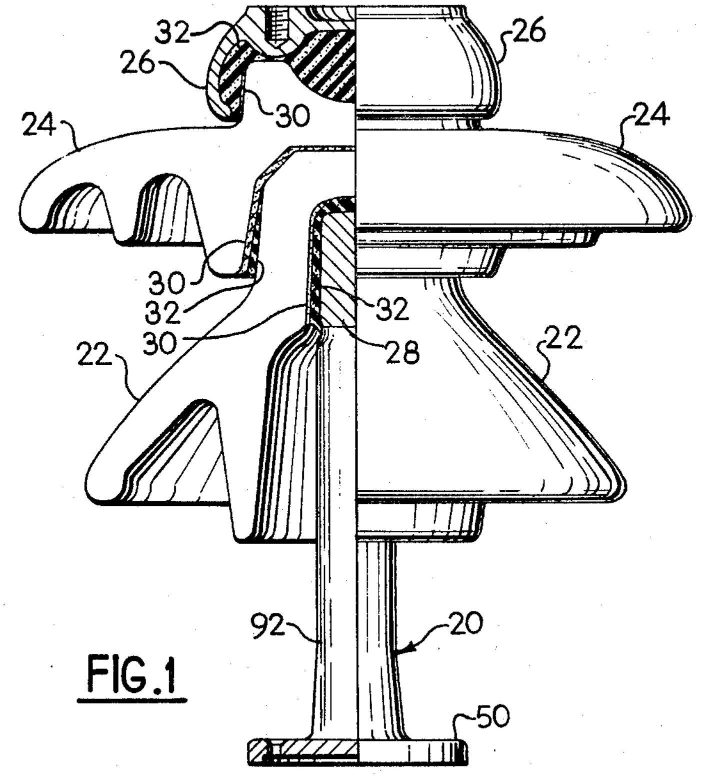
FIG. 1 is a side elevational view, partially in section, of an apparatus insulator that includes an insulating pin constructed in accordance with the present invention.

Referring in detail to the drawings, FIG. 1 illustrates an apparatus insulator which comprises an insulator pin indicated generally at 20 that supports a plurality of superimposed insulators 22, 24, and 26.

Insulator 22 is secured to a knurled portion 28 on the top of insulator pin 20 by a layer 30 of neat Portland cement and a suitable resilient compound 32 serves as an elastic cushion which compensates for different thermal coefficients of the components.

Insulator 24 is mounted on the top of insulator 22 and insulator 26 is mounted on the top of insulator 24 by similar layers of neat Portland cement 30 and resilient compound 32.

Figure 4:
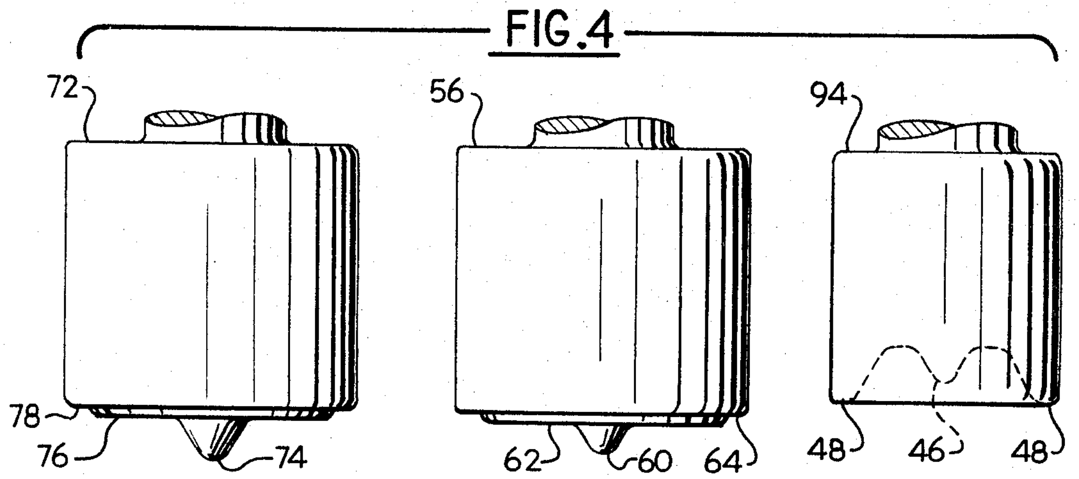
FIG. 4 is a partial side elevational view of three successive male die portions adapted to mate the female die portions of FIG. 3.
Figure 3:
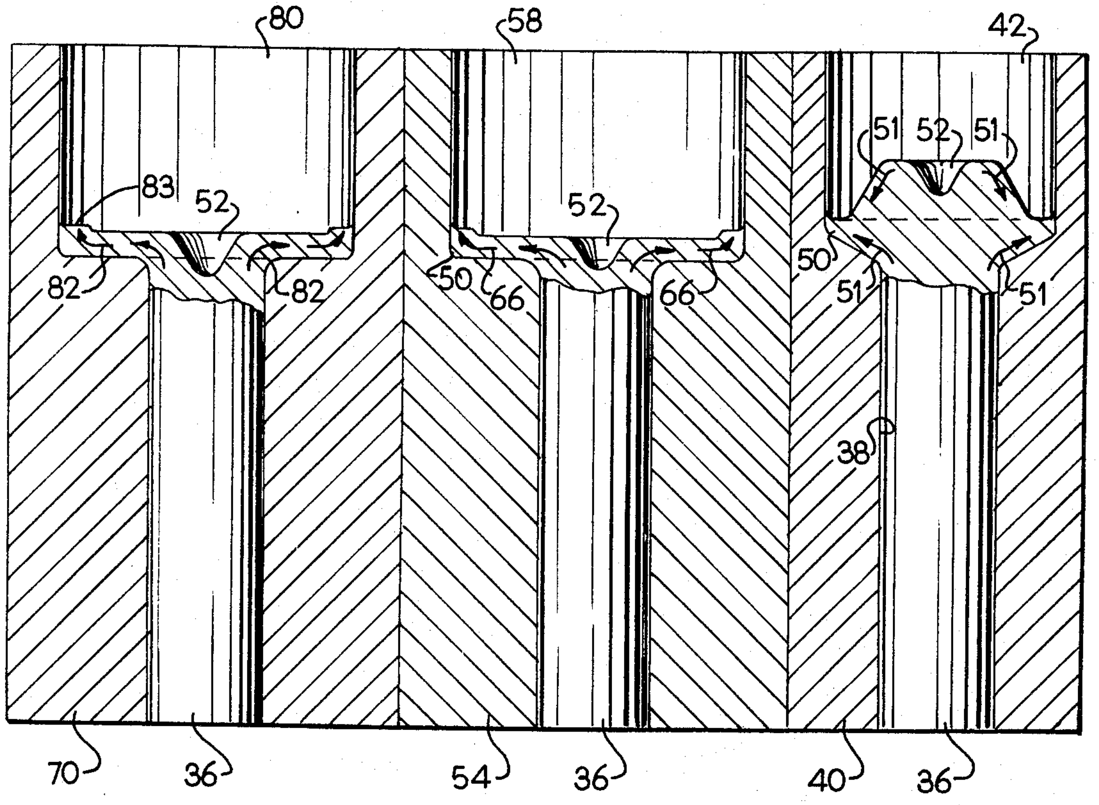
FIG. 3 is a side sectional view illustrating a workpiece in three successive stages of the formation of said workpiece, said workpiece being illustrated in three successive female die portions.

Reference is next made to FIGS. 3 and 4 wherein the method of fabricating the insulator 10 will be described in detail.

As seen in FIG. 3, a workpiece 36 is shown disposed in a bore 38 of a first female die portion 40 that includes a female die cavity 42 adapted to receive a first male die portion indicated generally at 44.

First male die portion 44 includes a central male die protrusion 46 surrounded by an annular male die protrusion 48 which are advanced against the end of rod shaped workpiece 36 to form the partially finished flange portion 50 as seen in the first female die portion 40.

Referring to first female die portion 40, when the first male die member 44 is advanced against the inner end of workpiece 36, then the male die protrusion 46 forms a central workpiece recess 52 and the axially applied pressure causes metal from the rod end to flow radially outwardly as is generally diagrammatically illustrated by the arrows seen on workpiece 36 in first female die portion 40.

Workpiece 36 is next transferred from first female die portion 40 to a second female die portion 54 by a suitable workpiece transfer mechanism not illustrated.

With workpiece 36 securely positioned in second female portion 54 a second male die portion indicated generally at 56 is advanced into a second female die cavity 58.

Second male die portion 56 includes a second central die protrusion 60 surrounded by an annular male die surface 62 which is in turn surrounded by a first annular male die recess 64.

When second male die member 56 engages the partially formed workpiece flange 50 it will produce a radially outward flow of metal generally as indicated by the arrows 66 on the workpiece in second female die portion 54.

Upon application of pressure by second male die member 56 on the partially flanged end of workpiece 36 metal flowing in the general pattern indicated by arrows 66 will enter and fill the outer annular male die recess 64. At the same time the second central protrusion 60 on second male die member 56 will enter and move inwardly the previously mentioned central workpiece recess 52 thereby providing the metal necessary to flow radially outwardly along the second flow path 66 illustrated on workpiece 36 disposed in second female die portion 54.

With continued reference to FIG. 3, workpiece 36 is next transferred from second female die portion 54 to a third female die portion 70 and a third male die portion indicated generally at 72 is provided with a central male die protrusion 74, a surrounding annular male die surface 76, and a peripheral male die recess 78.

Upon advancement of third male member 72 into a third female die recess 80 central protrusion 74 enters central die recess 52 and deepens said recess and applies pressure to unfinished flange portion 50 such as may be required to produce a third radially outward flow of metal indicated generally by arrows 82 on workpiece 36 disposed in third female die portion 70.

Figure 2:
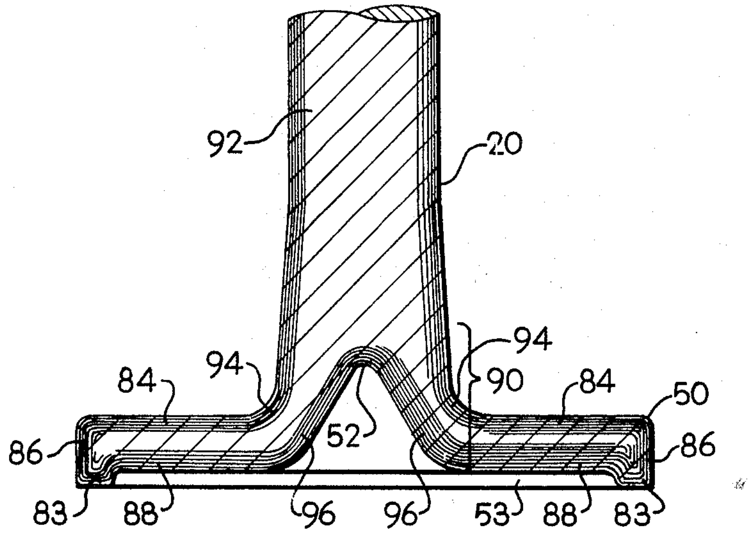
FIG. 2 is a partial side sectional view illustrating the metal grain structure of a shank to flange junction of the insulator pin of FIG. 1.

It should be pointed out that the deepening of central workpiece recess 52, and the radially outward flow 82 of metal serves to work-harden surface regions 84, 86, and 88 of flange 50 as is shown in detail in the cross-sectional grain structure view of FIG. 2.

It will be understood that in such work-hardening of the surface region the grain of the metal is refined and densified thereby increasing its toughness and strength.

It should be further mentioned that the forming method just described produces a flow of metal in a generally frustoconical junction portion between flange 50 and shank portion 92 of the insulator pin.

It will be understood that the previously described method of shaping workpieces causes the flow of metal axially and radially as is indicated by the three progressive flow patterns 51, 66, and 82 thereby producing surface zones 94 and 96, FIG. 2, of densified refined work-hardened metal. It should be further pointed out that the method just described not only forms the central workpiece recess 52 but also forms the surrounding annular workpiece recess 53, FIG. 2, which provides for the annular base flange 83 that rests directly on the supporting subfloor.

While the form of embodiment of the present invention as herein disclosed constitutes a preferred form, it is to be understood that other forms might be adopted, all coming within the scope of the claims which follow.

What is claimed is:

1. An improved insulator pin comprising a shank portion and an integral flange portion that includes an outer surface provided with a recess that extends centrally through said flange portion and into said shank portion, said recess being surrounded by an annular protrusion, the junction of said shank and flange portions including work-hardened surface regions.

2. An improved insulator pin comprising a shank portion, a flange portion, and a bottom recess that extends centrally through said flange portion and into said shank portion and forms therewith an integral generally frustoconical junction between said shank portion and said flange portion, said junction including surface regions of work-hardened metal that strengthen said junction.

3. In the method of forming insulator pins the steps of axially applying pressure to the end of a metal workpiece to flow metal of said workpiece radially outwardly and form a partially completed flange portion comprising an outer workpiece surface that includes an annular workpiece protrusion surrounding a central workpiece recess; and applying pressure to said annular workpiece protrusion to flow metal radially outwardly from said annular workpiece protrusion to form a second annular workpiece protrusion on the periphery of a completely shaped and work-hardened flange portion.

4. In the method of forming insulator pins the steps of axially applying pressure to the end of a metal workpiece to flow metal of said workpiece radially outwardly and form a partially completed flange portion comprising an outer workpiece surface that includes an annular workpiece protrusion surrounding a central workpiece recess; and applying pressure to said annular workpiece protrusion to displace said annular workpiece protrusion and central recess radially inwardly and thereby flow metal radially outwardly from said annular workpiece protrusion to form a second annular workpiece protrusion on the periphery of a completely shaped and work-hardened flange portion.

5. The steps in the method of forming insulator pins which method comprises positioning a metal workpiece in a bore in a first female die with an end of said workpiece extended into a first female die cavity; moving a first male die member into said first female die cavity; said first male die member including a central protrusion for engaging the center of said metal workpiece to start the formation of a workpiece recess to flow metal of said workpiece radially outwardly, said first male die member further including an annular protrusion for confining said radial flow of metal to said first female die cavity and thereby partially form a flange on said workpiece end; positioning said metal workpiece in a bore in a second female die with said partially formed flange disposed in a second female die cavity of greater diameter than said first female die cavity; moving a second male die member into said second female die cavity, said second male die member including a second central protrusion that enters said workpiece recess, an annular male die surface surrounding said second central protrusion for directing a second flow of metal from said partially formed flange radially outwardly, and an annular male die recess surrounding said male die surface for receiving metal from said second flow and thereby form an annular protrusion on said partially flanged workpiece end; positioning said metal workpiece in a bore in a third female die with said partially flanged workpiece end disposed in a third female die cavity; moving a third male die member into said third female die cavity, said third male die member including a third central protrusion of larger dimension than said second central protrusion that enters said workpiece recess, a second annular male die surface, and a second annular male die recess, said central protrusion, surface, and recess of said third male die member serving to direct a third flow of metal from said partially formed flange into the shape and dimension of the finished flange.

6. The steps in the method of forming insulator pins which method comprises positioning a metal workpiece in a bore in a first female die with an end of said workpiece extended into a first female die cavity; moving a first male die member that includes a central die protrusion and a peripheral die protrusion into engagement with said workpiece end to radially flow metal into a partially formed flange that includes an annular workpiece protrusion that surrounds a central workpiece recess; positioning said metal workpiece in a bore in a second female die with said partially formed flange disposed in a second female die cavity of greater diameter that said first female die cavity; moving a second male die member into said second female die cavity, said second male die member including a second central protrusion that enters said workpiece recess, an annular male die surface surrounding said second central protrusion for directing a second flow of metal from said partially formed flange radially outwardly, and an annular male die recess surrounding said male die surface for receiving metal from said second flow and thereby form an annular protrusion on said partially flanged workpiece end; positioning said metal workpiece in a bore in a third female die with said partially flanged workpiece end disposed in a third female die cavity; moving a third male die member into said third female die cavity, said third male die member including a third central protrusion of larger dimension that said second central protrusion that enters said workpiece recess, a second annular male die surface, and a second annular male die recess, said central protrusion, surface, and recess of said third male die member serving to direct a third flow of metal from said partially formed flange into the shape and dimension of the finished flange.

7. The steps in the method of forming insulator pins which method comprises positioning a metal workpiece in a bore in a first female die with an end of said workpiece extended into a first female die cavity; moving a first male die member that includes a central die protrusion and a peripheral die protrusion into engagement with said workpiece end to radially flow metal into a partially formed flange that includes an annular workpiece protrusion that surrounds a central workpiece recess; positioning said metal workpiece in a bore in a second female die with said partially formed flange disposed in a second female die cavity of greater diameter than said first female die cavity; moving a second male die member into said second female die cavity, said second male die member including a die surface for engagement with said annular workpiece protrusion to direct a second flow of metal from said partially formed flange radially outwardly; positioning said metal workpiece in a bore in a third female die with said partially flanged workpiece end disposed in a third female die cavity; moving a third male die member into said third female die cavity, said third male die member including a second die surface for engagement with said partially formed flange to direct a third flow of metal radially outwardly to form a finished work-hardened flange on said workpiece.

8. The steps in the method of forming insulator pins which method comprises positioning a metal workpiece in a bore in a first female die with an end of said workpiece extended into a first female die cavity; moving a first male die member that includes a central die protrusion and a peripheral die protrusion into engagement with said workpiece end to radially flow metal into a partially formed flange that includes an annular workpiece protrusion that surrounds a central workpiece recess; positioning said metal workpiece in a bore in a second female die with said partially formed flange disposed in a second female die cavity of greater diameter than said first female die cavity; moving a second male die member into said second female die cavity, said second male die member including a die surface for engagement with said annular workpiece protrusion to direct a second flow of metal from said partially formed flange radially outwardly; positioning said metal workpiece in a bore in a third female die with said partially flanged workpiece end disposed in a third female die cavity; moving a third male die member into said third female die cavity, said third male die member including a second die surface for engagement with said partially formed flange to direct a third flow of metal radially outwardly to form a finished work-hardened flange on said workpiece, certain of said first and second die surfaces including a peripheral die recess for receiving metal from said third flow and thereby form a peripheral workpiece protrusion on said flange.

9. The steps in the method of forming insulator pins which method comprises positioning a metal workpiece in a bore in a first female die with an end of said workpiece extended into a first female die cavity; moving a first male die member that includes a central die protrusion and a peripheral die protrusion into engagement with said workpiece end to radially flow metal into a partially formed flange that includes an annular workpiece protrusion that surrounds a central workpiece recess; positioning said metal workpiece in a bore in a second female die with said partially formed flange disposed in a second female die cavity of greater diameter than said first female die cavity; moving a second male die member into said second female die cavity, said second male die member including a die surface for engagement with said annular workpiece protrusion to direct a second flow of metal from said partially formed flange radially outwardly; positioning said metal workpiece in a bore in a third female die with said partially flanged workpiece end disposed in a third female die cavity; moving a third male die member into said third female die cavity, said third male die member including a second die surface for engagement with said partially formed flange to direct a third flow of metal radially outwardly to form a finished work-hardened flange on said workpiece, faces including a second central die protrusion for entering a second central die protrusion for entering and enlarging said central workpiece recess.

10. The steps in the method of forming insulator pins which method comprises positioning a metal workpiece in a bore in a first female die with an end of said workpiece extended into a first female die cavity; moving a first male die member that includes a central die protrusion and a peripheral die protrusion into engagement with said workpiece end to radially flow metal into a partially formed flange that includes an annular workpiece protrusion that surrounds a central workpiece recess; positioning said metal workpiece in a bore in a second female die with said partially formed flange disposed in a second female die cavity of greater diameter than said first female die cavity; moving a second male die member into said second female die cavity, said second male die member including a die surface for engagement with said annular workpiece protrusion to direct a second flow of metal from said partially formed flange radially outwardly; positioning said metal workpiece in a bore in a third female die with said partially flanged workpiece end disposed in a third female die cavity; moving a third male die member into said third female die cavity, said third male die member including a second die surface for engagement with said partially formed flange to direct a third flow of metal radially outwardly to form a finished work-harden flange on said workpiece, certain of said first and second die surfaces including a peripheral die recess for receiving metal from said third flow and thereby form a peripheral workpiece protrusion on said flange, certain of said first and second die surfaces including a second central die protrusion for entering and enlarging said central workpiece recess.

References Cited

UNITED STATES PATENTS

| | | | |
|---|---|---|---|
| 1,702,237 | 2/1929 | Austin | 29—631 |
| 1,968,792 | 7/1934 | Yoemans | 72—356 |
| 2,368,695 | 2/1945 | Wilber | 72—356 |

OTHER REFERENCES

Electrical World, Aug. 31, 1959, p. 50, copy in 174/194.

CHARLES W. LANHAM, *Primary Examiner.*

L. A. LARSON, *Assistant Examiner.*